(12) United States Patent
Yasuho et al.

(10) Patent No.: US 7,289,669 B2
(45) Date of Patent: Oct. 30, 2007

(54) DATA MANAGING METHOD AND APPARATUS FOR PROVIDING DIVISIONAL DATA

(75) Inventors: Tsuneki Yasuho, Moriguchi (JP); Kunihiko Nakashima, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 754 days.

(21) Appl. No.: 10/311,662

(22) PCT Filed: Jun. 21, 2001

(86) PCT No.: PCT/JP01/05329

§ 371 (c)(1),
(2), (4) Date: Jul. 3, 2003

(87) PCT Pub. No.: WO01/99406

PCT Pub. Date: Dec. 27, 2001

(65) Prior Publication Data

US 2004/0036913 A1    Feb. 26, 2004

(30) Foreign Application Priority Data

Jun. 23, 2000    (JP)    ............................. 2000-188910

(51) Int. Cl.
*G06K 9/36*    (2006.01)
*G06K 9/00*    (2006.01)
(52) U.S. Cl. .................................................... 382/232
(58) Field of Classification Search .............. 382/173, 382/178, 232, 233, 240, 305; 345/619, 620; 341/28, 50, 51, 67, 79, 87; 358/1.115, 1.116; 709/206; 711/162; 714/765; 725/119
See application file for complete search history.

(56) References Cited

U.S. PATENT DOCUMENTS

| | | | | |
|---|---|---|---|---|
| 4,464,650 A | * | 8/1984 | Eastman et al. | ............... 341/51 |
| 5,216,677 A | * | 6/1993 | Takagi et al. | ............... 714/765 |
| 5,629,948 A | * | 5/1997 | Hagiwara et al. | ........... 714/748 |
| 6,000,020 A | * | 12/1999 | Chin et al. | ................... 711/162 |
| 6,615,241 B1 | * | 9/2003 | Miller et al. | ................ 709/206 |
| 6,789,263 B1 | * | 9/2004 | Shimada et al. | ............ 725/119 |

FOREIGN PATENT DOCUMENTS

| | | |
|---|---|---|
| JP | 03-137772 | 6/1991 |
| JP | 05-173260 | 7/1993 |
| JP | 09-069810 | 3/1997 |

OTHER PUBLICATIONS

Japanese International Search Report for PCT/JP01/05329, dated Sep. 18, 2001.
English translation of Japanese International Search Report for PCT/JP01/05329, dated Sep. 18, 2001.

* cited by examiner

*Primary Examiner*—Amir Alavi
(74) *Attorney, Agent, or Firm*—RatnerPrestia

(57) ABSTRACT

A data managing device includes divisional decoded data storage for at least storing divisional data obtained by dividing data of a predetermined unit; and priority order management for at least determining the priority as to erasure of the stored divisional data by use of a predetermined rule.

10 Claims, 12 Drawing Sheets

Fig. 7

Divisional decoded data

| Divisional decoded data identifier | Picture size | Relative coordinates | Coded data identifier |
|---|---|---|---|
| 1A | 120×50 | (0,0) | 1 |
| 1B | 120×50 | (0,50) | 1 |
| 1C | 120×50 | (0,100) | 1 |
| 1D | 120×20 | (0,150) | 1 |

US 7,289,669 B2

DATA MANAGING METHOD AND APPARATUS FOR PROVIDING DIVISIONAL DATA

THIS APPLICATION IS A U.S. NATIONAL PHASE APPLICATION OF PCT INTERNATIONAL APPLICATION PCT/JP01/05329.

TECHNICAL FIELD

The present invention relates to a data managing device, a data display device, a data managing method, a data display method, a program and a medium of managing decoded data obtained by decoding coded data such as compressed bitmapped graphics.

BACKGROUND ART

When coded data such as compressed bitmapped graphics is drawn, a method decoding data every time the data is redrawn makes processing late because the decoding takes time. Therefore, because the data decoded once is temporarily stored in a memory apparatus, the decoding is omitted and speed-up of processing has been achieved by using the temporarily stored decoded data when the decoded data is again needed for redrawing or the like.

FIG. 9 shows a block diagram of a conventional data managing device. Coded data storing means stores coded data. The coded data is decoded by decoding means, and is stored in decoded data storing means. Access order storing means stores the order of access among decoded data. Priority order managing means determines the priority of each piece of decoded data according to the order of access. And when a memory area is insufficient, a piece of decoded data with low priority is deallocated from the memory area by an LRU algorithm.

However, since this conventional data managing device collectively stores and deallocated the whole of the decoded data obtained by decoding the coded data, the whole of the decoded data is held stored even when part of the decoded data is only frequently used, and the use efficiency of the memory area is lowered.

As an example, take a drawing processing wherein both a background picture and a picture 1 which are compressed bitmaps overlap each other and the picture 1 is replaced with a picture 2 and then a picture 3 as shown in FIG. 10 which is a view for explaining the problem of the conventional data managing device.

When the picture 1, the picture 2 and the picture 3 include a transparent color, since it is necessary that the background picture be seen through the part of the transparent color, it is necessary to redraw the part of the background picture where the picture 1 is replaced with another picture before drawing the replacing picture.

In this case, when the conventional data managing device is used, the decoded data of the background picture that is accessed every time the picture is replaced has higher priority than the picture 1, the picture 2 and the picture 3. In a case that the memory area is insufficient, if the decoded data of the background picture is stored, the decoded data of another picture is not able to be stored. Therefore it is necessary to re-decode the coded data of the picture 1, the picture 2 or the picture 3 every time the picture is replaced and so that processing requires time.

DISCLOSURE OF INVENTION

In view of the above-mentioned problem of the prior art, an object of the present invention is to provide a data managing device, a data display device, a data managing method, a data display method, a program and a medium capable of improving the use efficiency of the memory area.

A 1st invention of the present invention (corresponding to Claim 1) is a data managing device comprising:

data storing means of at least storing divisional data obtained by dividing data of a predetermined unit; and erasure priority order determining means of at least determining priority as to erasure of the stored divisional data by use of a predetermined rule.

A 2nd invention of the present invention is a data managing device according to the 1st invention, comprising access frequency detecting means of at least detecting a frequency of access to the stored divisional data, wherein said determined rule is a rule for providing divisional data whose detected frequency of access is higher with lower priority of erasure.

A 3rd invention of the present invention (corresponding to Claim 3) is a data managing device according to the 1st invention, comprising access time detecting means of at least detecting a time of access to the stored divisional data, wherein said predetermined rule is a rule for providing divisional data whose detected time of access is later with lower priority of erasure.

One aspect of the present invention is a data managing device comprising:

A 4th invention of the present invention is a data managing device comprising:

data storing means of at least storing divisional data obtained by dividing data of a predetermined unit, erasure priority order determining means of at least determining priority as to erasure of the stored divisional data by use of a predetermined rule, and access frequency detecting means of at least detecting a frequency of access to the stored divisional data; and wherein said predetermined rule is a rule, (1) for providing divisional data whose detected frequency of access is higher with lower priority of erasure, and (2) for providing divisional data requiring more procedures for the decoding with lower priority of erasure, and said data of the predetermined unit is data obtained by decoding coded data.

Another aspect of the present invention is a data managing device comprising:

A 5th invention of the present invention is a data managing device comprising:

data storing means of at least storing divisional data obtained by dividing data of a predetermined unit, erasure priority order determining means of at least determining priority as to erasure of the stored divisional data by use of a predetermined rule, and access time detecting means of at least detecting a time of access to the stored divisional data; and wherein said predetermined rule is a rule, (1) for providing divisional data whose detected time of access is later with lower priority of erasure, and (2) for providing divisional data requiring more procedures for the decoding with lower priority of erasure, and said data of the predetermined unit is data obtained by decoding coded data.

A further aspect of the present invention is a data managing device, wherein said divisional data requiring more procedures for the decoding is data to be displayed in a lower part of a predetermined screen where the display is to be provided.

A 6th invention of the present invention is a data managing device according to the 4th or the 5th invention, wherein said divisional data requiring more procedures for the decoding is data to be displayed in a lower part of a predetermined screen where the display is to be provided.

A still further aspect of the present invention is a data display device comprising:

the data managing device;

A 7th invention of the present invention is a data display device comprising:

the data managing device according to any of the 4th to the 6th inventions;

superposing means of superposing one on another the divided data of the predetermined unit and another divided data of the predetermined unit or data of the predetermined unit not divided which data are stored in the data storing means, and storing the data into a predetermined screen memory as composite data; and display means of displaying the composite data stored in the screen memory.

A yet further aspect of the present invention is a data display device comprising:

An 8th invention of the present invention is a data display device comprising:

data storing means of temporarily storing a plurality of pieces of data of a predetermined unit;

a plurality of screen memories of extracting and storing the temporarily stored pieces of data of the predetermined unit;

superposing means of superposing, for each pixel, any of the pieces of data of the predetermined unit from the screen memories based on overlap information for displaying the pieces of data of the predetermined unit so that they overlap each other;

display means of displaying the superposed data for each pixel; and erasure priority order determining means of determining the priority as to erasure of the temporarily stored pieces of data of the predetermined unit by use of a predetermined rule.

A still yet further aspect of the present invention is a data display device, wherein said predetermined rule is a rule for providing lower priority of erasure to, of the overlapping pieces of data of the predetermined unit, a piece of data situated forwarder.

A 9th invention of the present invention is a data display device according to the 8th invention, wherein said predetermined rule is a rule for providing lower priority of erasure to, of the overlapping pieces of data of the predetermined unit, a piece of data situated forwarder.

An additional aspect of the present invention is a data display device, wherein of the overlapping pieces of data of the predetermined unit, a piece of data at the top is PNG data for providing a predetermined bitmap display.

A 10th invention of the present invention is a data display device according to the 9th invention, wherein of the overlapping pieces of data of the predetermined unit, a piece of data at the top is PNG data for providing a predetermined bitmap display.

A yet additional aspect of the present invention is a data display method comprising:

A 12th invention of the present invention is a data display method comprising:

a step of temporarily storing a plurality of pieces of data of a predetermined unit;

a step of extracting the temporarily stored pieces of data of the predetermined unit and storing them into a plurality of screen memories;

a step of superposing, for each pixel, any of the pieces of data of the predetermined unit from the screen memories based on overlap information for displaying the pieces of data of the predetermined unit so that they overlap each other;

a step of displaying the superposed data for each pixel; and a step of determining priority as to erasure of the temporarily stored pieces of data of the predetermined unit by use of a predetermined rule.

A supplementary aspect of the present invention is a program for causing a computer to execute all or some of the following steps of the data display method: a step of temporarily storing a plurality of pieces of data of a predetermined unit; a step of extracting the temporarily stored pieces of data of the predetermined unit and storing them into a plurality of screen memories; a step of superposing, for each pixel, any of the pieces of data of the predetermined unit from the screen memories based on overlap information for displaying the pieces of data of the predetermined unit so that they overlap each other; a step of displaying the superposed data for each pixel; and a step of determining priority as to erasure of the temporarily stored pieces of data of the predetermined unit by use of a predetermined rule.

A 14th invention of the present invention is a program for causing a computer to execute all or some of the following steps of the data display method according to the 12th invention: a step of temporarily storing a plurality of pieces of data of a predetermined unit; a step of extracting the temporarily stored pieces of data of the predetermined unit and storing them into a plurality of screen memories; a step of superposing, for each pixel, any of the pieces of data of the predetermined unit from the screen memories based on overlap information for displaying the pieces of data of the predetermined unit so that they overlap each other; a step of displaying the superposed data for each pixel; and a step of determining priority as to erasure of the temporarily stored pieces of data of the predetermined unit by use of a predetermined rule.

A yet supplementary aspect of the present invention is a computer-processable medium carrying a program for causing a computer to execute all or some of the following steps of the data display method: a step of temporarily storing a plurality of pieces of data of a predetermined unit; a step of extracting the temporarily stored pieces of data of the predetermined unit and storing them into a plurality of screen memories; a step of superposing, for each pixel, any of the pieces of data of the predetermined unit from the screen memories based on overlap information for displaying the pieces of data of the predetermined unit so that they overlap each other; a step of displaying the superposed data for each pixel; and a step of determining priority as to erasure of the temporarily stored pieces.

A 16th invention of the present invention (corresponding to Claim 16) is a computer-processable medium carrying a program for causing a computer to execute all or some of the following steps of the data display method according to the 12th invention: a step of temporarily storing a plurality of pieces of data of a predetermined unit; a step of extracting the temporarily stored pieces of data of the predetermined unit and storing them into a plurality of screen memories; a step of superposing, for each pixel, any of the pieces of data of the predetermined unit from the screen memories based on overlap information for displaying the pieces of data of the predetermined unit so that they overlap each other; a step of displaying the superposed data for each pixel; and a step of determining priority as to erasure of the temporarily stored pieces of data of the predetermined unit by use of a predetermined rule.

BRIEF DESCRIPTION OF DRAWINGS

FIG. 7 is a view for explaining information on divisional decoded data in the first embodiment of the present invention;

FIGS. 8-1 and 8-2 are flowcharts for explaining the priority determination processing by the data managing device of the first embodiment of the present invention;

EXPLANATION OF REFERENCE NUMERALS

Figure 1:
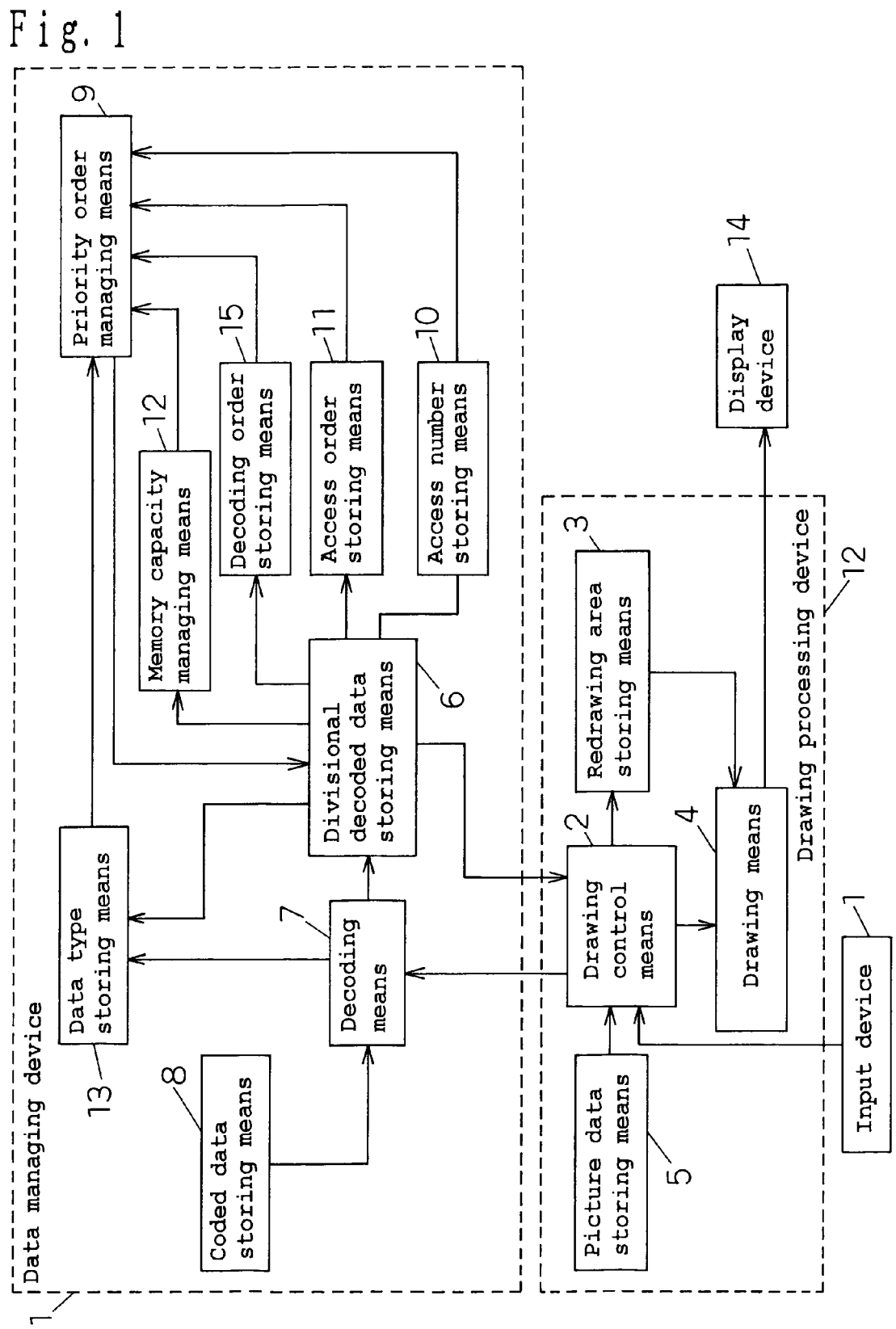
FIG. 1 is a block diagram of a data managing device of a first embodiment of the present invention.

6 Divisional decoded data storing means
8 Coded data storing means
9 Priority order managing means
10 Access number storing means
11 Access order storing means
13 Data type storing means

BEST MODE FOR CARRYING OUT THE INVENTION

Embodiments of the present invention will be described with reference to the drawings.

First Embodiment

First, the structure of a data managing device of the present embodiment will be described with reference mainly to FIG. 1 showing a block diagram of the data managing device of the present embodiment.

In FIG. 1, reference numeral 8 represents coded data storing means of storing coded data, reference numeral 7 represents decoding means of decoding the coded data stored in the coded data storing means 8, reference numeral 6 represents divisional decoded data storing means (data storing means) of dividing the data decoded by the decoding means 7 and storing the data as divisional data, reference numeral 13 represents data type storing means of associating and storing the divisional decoded data and a screen (screen memory) where the divisional decoded data is to be displayed, reference numeral 10 represents access number storing means of counting and storing the number of times of access to each piece of divisional decoded data, reference numeral 11 represents access order storing means of storing the order of access among the divisional decoded data, reference numeral 15 represents decoding order storing means of storing the priority of decoding of each piece of divisional decoded data, reference numeral 12 represents memory capacity managing means of checking the remaining memory capacity at the time of the data storage by the divisional decoded data storing means 6, and when the memory capacity is insufficient, requesting priority order managing means 9 to deallocate a memory area. Reference numeral 9 represents the priority order managing means (erasure priority order determining means) of determining the priority of each piece of divisional decoded data by use of the data stored in the access number storing means 10, the access order storing means 11, the data type storing means 13 and the decoding order storing means 15, and deallocating a piece of divisional decoded data with low priority when deallocation of a memory area is requested by the memory capacity managing means 12. Reference numeral 2 represents drawing control means of determining whether redrawing is necessary or not according to an input from an input device 1, making redrawing area means 3 store a redrawing area requiring redrawing, searching for picture data such as the display size, the coordinates and the Z order stored in picture data storing means 5, searching for the divisional decoding data stored in the divisional decoded data storing means 6 when a picture overlapping the redrawing area is present, causing the decoding means 7 to perform decoding when the divisional decoded data requiring redrawing is not stored, and causing drawing means 4 to perform drawing by use of the divisional decoded data.

Figure 2:
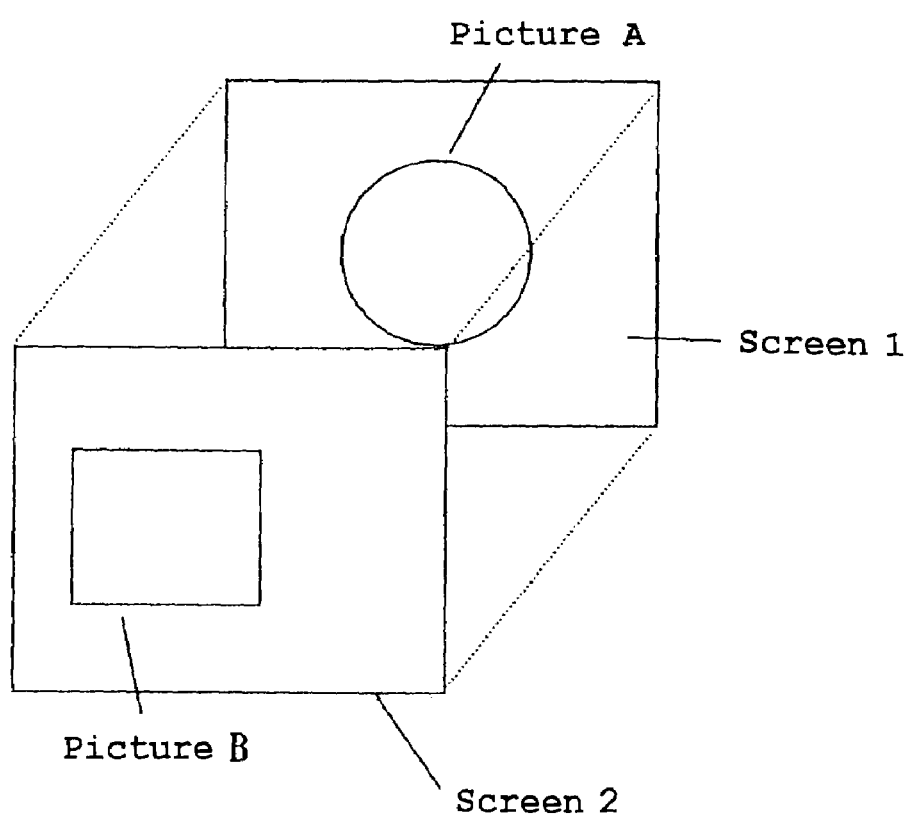
FIG. 2 is an explanatory view of the positional relationship between screens 1 and 2 in the first embodiment of the present invention.
Figure 3:
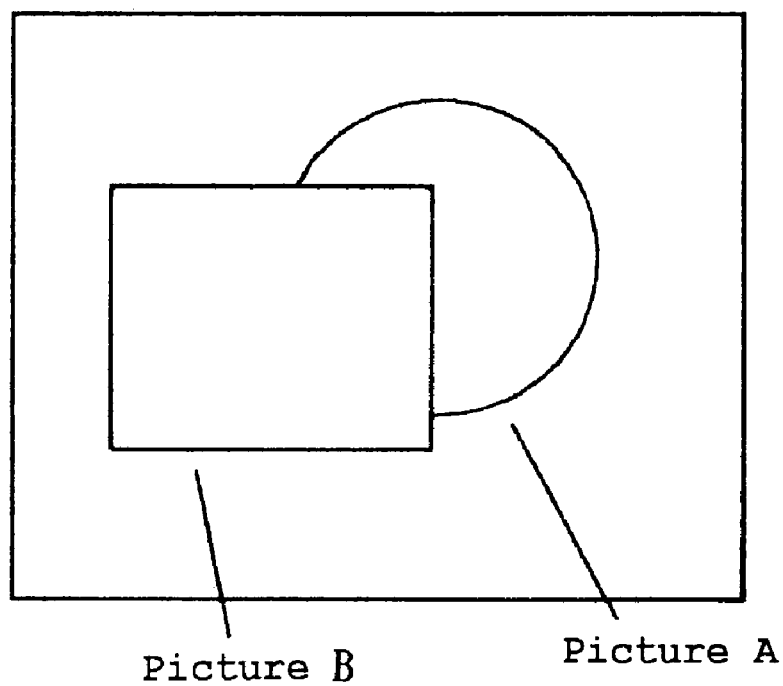
FIG. 3 is an explanatory view of superposition of pictures A and B in the first embodiment of the present invention.

Here, the drawing means 4 is means of performing drawing on screens (screen memories) 1 and 2 as shown in FIG. 2 which is an explanatory view of the positional relationship between the screens 1 and 2 of the present embodiment corresponding to so-called video RAM. A picture A (typically, JPEG data for displaying the background that moves only a little) and a picture B (typically, PNG data for displaying a bitmap (icon) that moves a lot) drawn on the screens 1 and 2, respectively, are displayed by use of a display device 14 so as to be superposed one on another as shown in FIG. 3 which is an explanatory view of the superposition of the pictures A and B in the present embodiment. To sum up, data is superposed (selected) for each pixel from any of a plurality of screen memories based on overlap information for displaying a plurality of pieces of data with overlapping each other (for example, in a case of that the data in front includes a translucent color or the like, it is necessary for the data at the back to be seen through, therefore a superposition processing as drawing the data in front after redrawing the data at the back is necessary).

The division of the decoded data by the divisional decoded data storing means 6 and the determination of the priority at the time of the deallocation of the divisional decoded data by the priority order managing means 9 will be described later in detail.

Figure 4:
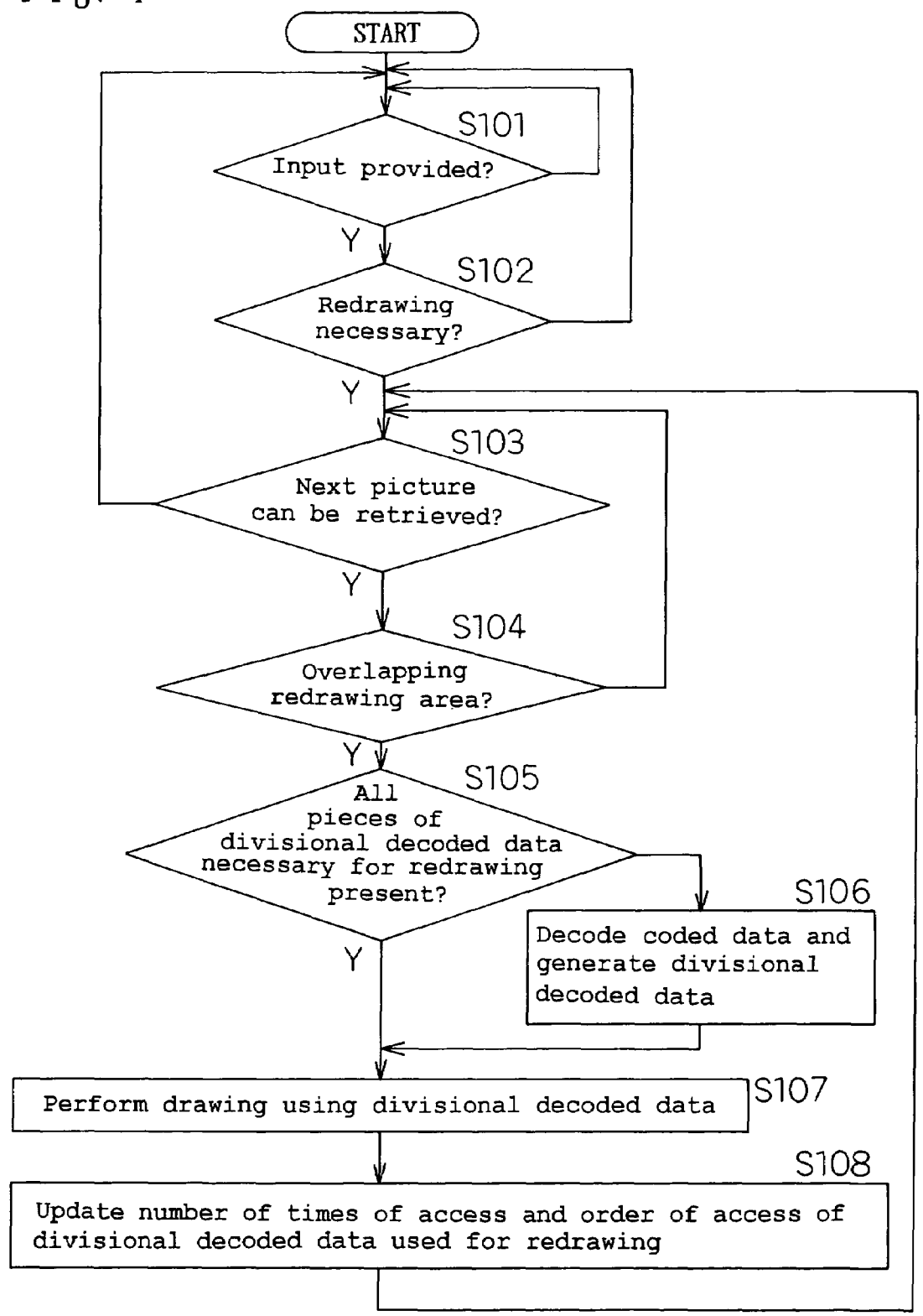
FIG. 4 is a flowchart for explaining the operation of the data managing device of the first embodiment of the present invention.

Next, the operation of the data managing device of the present embodiment will be described with reference mainly to FIG. 4 that is a flowchart for explaining the operation of the data managing device of the present embodiment. An embodiment of the data managing method of the present invention will also be described while the operation of the data managing device of the present embodiment is described.

When an input is provided from the input device 1 (see FIG. 1) at step 101, the process shifts to step 102.

When redrawing is necessary because of a movement of a picture or a change between display and non-display as a result of the input from the input device 1 at step 102, the process shifts to step 103 (otherwise, the process returns to step 101).

At step 103, search for all the pictures is started, and when picture data can be retrieved from the picture data storing means 5 (see FIG. 1), the process shifts to step 104 (otherwise, the process returns to step 101).

When the retrieved picture data overlaps the redrawing area at step 104, the process shifts to step 105 (otherwise, the process returns to step 103 to search for the next picture data).

When all the pieces of divisional decoded data necessary for redrawing of the retrieved picture data are present in the divisional decoded data storing means 6 (see FIG. 1) at step 105, the process shifts to step 107.

When all the pieces of divisional decoded data necessary for redrawing are not present in the divisional decoded data storing means 6, the process shifts to step 106, where the divisional decoded data necessary for redrawing that the decoding means 7 (see FIG. 1) decoded from the coded data in the coded data storing means 8 (see FIG. 1) is to be stored into the divisional decoded data storing means 6, and then the process shifts to step 107.

At step 107, the divisional decoded data storing means 6 is searched for the divisional decoded data necessary for redrawing, and clip drawing is performed in the redrawing area.

At step 108, the number of times of access and the order of access of the divisional decoded data stored in the access number storing means 10 (see FIG. 1) and the access order storing means 11 (see FIG. 1), respectively, and used at step 107 are updated, and the process returns to step 103.

Figure 5:
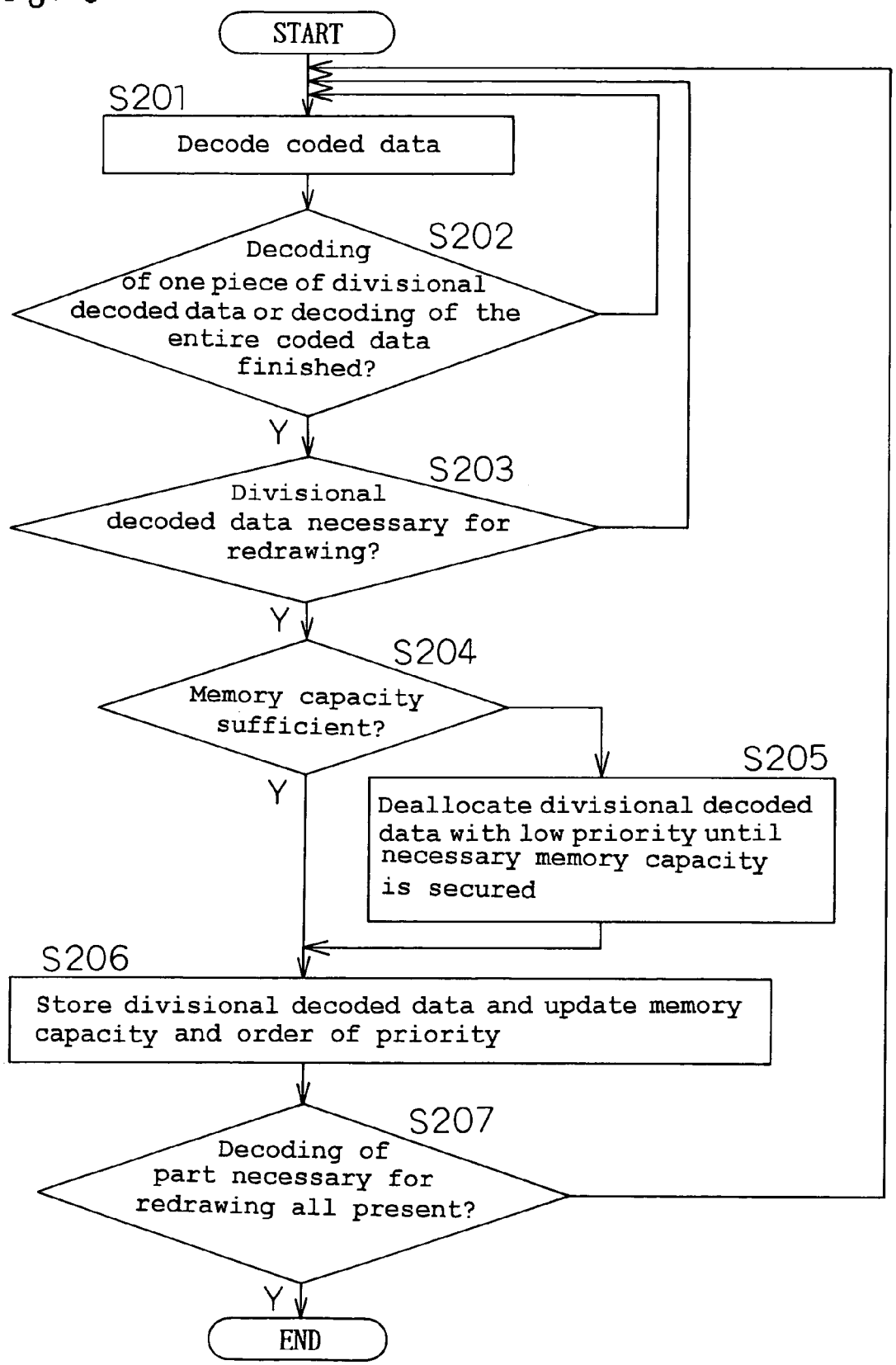
FIG. 5 is a flowchart for explaining the decoding process by the data managing device of the first embodiment of the present invention.

The operation performed when the decoding means 7 decodes the coded data in the coded data storing means 8 at step 106 (see FIG. 4) will be described in more detail with reference mainly to FIG. 5 that is a flowchart for explaining the decoding processing by the data managing device of the present embodiment.

At step 201, the decoding means 7 receives a request for decoding from the drawing control means 2 (see FIG. 1), and starts decoding of the specified coded data.

When decoding of the entire coded data (that is, data of a predetermined unit) is finished or decoding of one piece of divisional decoded data (that is, divisional data divided the data of a predetermined unit) is finished at step 202, the process proceeds to step 203 (otherwise, the process returns to step 201 to continue decoding).

At step 203, it is determined whether the divisional decoded data is necessary for redrawing or not, and when it is necessary, the process proceeds to step 204 (otherwise, the process returns to step 201).

When the memory capacity is insufficient for storing the divisional decoded data at step 204, the process shifts to step 205 (when the memory capacity is sufficient, the process immediately shifts to step 206).

At step 205, divisional decoded data stored in the divisional decoded data storing means 6 are deallocated in increasing order of priority until the necessary memory capacity is secured, and the process shifts to step 206.

At step 206, the divisional decoded data having been decoded is stored into the divisional decoded data storing means 6, and the following are updated: the memory capacity in the memory capacity managing means 12 (see FIG. 1); the order of decoding in the decoding order storing means 15 (see FIG. 1); the information stored in the data type storing means 13 (see FIG. 1); and the order of priority in the priority order managing means 9 (see FIG. 1).

When all the pieces of divisional decoded data necessary for redrawing are decoded at step 207, the process ends (otherwise, the process returns to step 201).

As described above, in the present embodiment, the unit used as the reference when decoding is performed is a predetermined unit. It is to be noted that in the divisional decoded data storing means 6, the whole of the coded data that is data of such a unit may be stored together with the divisional decoded data generated by dividing the data of the unit.

Next, the division of the decoded data by the divisional decoded data storing means 6 will be described in more detail.

Figure 6:
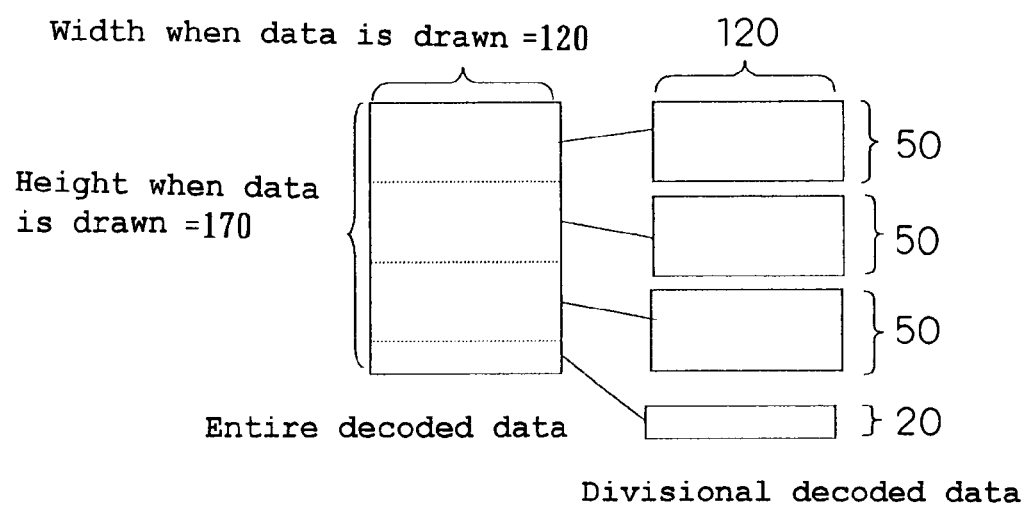
FIG. 6 is a view for explaining the division of the decoded data in the first embodiment of the present invention.

In the present embodiment, in dividing the decoded data, the decoded data is divided so that the overall height 170 is divided into the picture heights 50 as shown in FIG. 6 that is a view for explaining the division of the decoded data in the present embodiment.

In the divisional decoded data storing means 6, the picture size of each piece of divisional decoded data, the relative coordinates for the entire decoded data and the identifier of the coded data from which the decoded data is generated are stored as well as the divisional decoded data as shown in FIG. 7 which is a view for explaining information on the divisional decoded data in the present embodiment. This enables the determination of step 203 (see FIG. 5) as to whether the redrawing area and the area where the divisional decoded data is displayed overlap each other or not, and when these areas overlap each other, it is determined that the divisional decoded data is necessary for redrawing.

Next, the determination of the priority by the priority order managing means 9 at the time when the divisional decoded data is deallocated will be described in more detail.

Figures 1, 8:
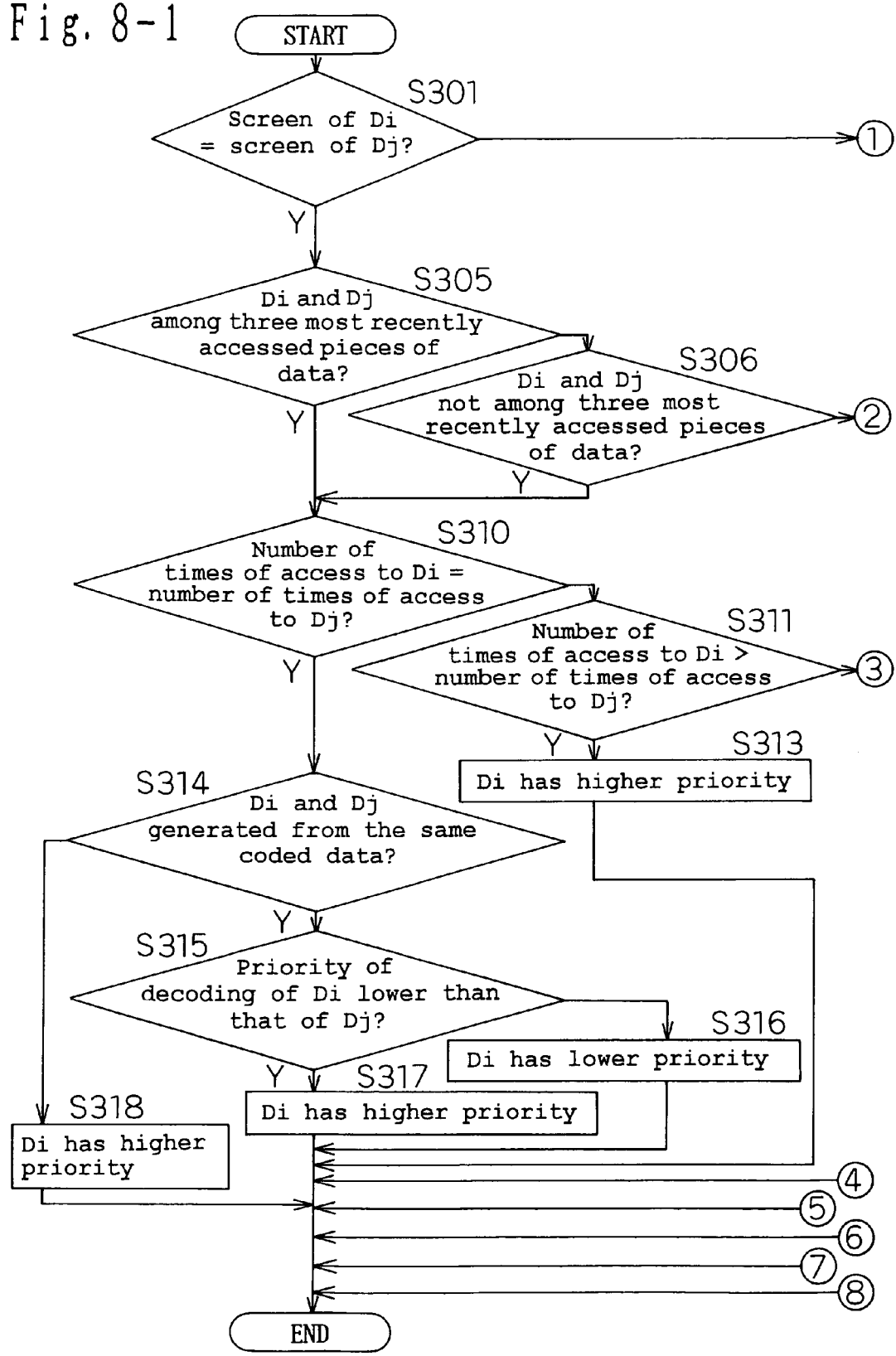
Figures 2, 8:
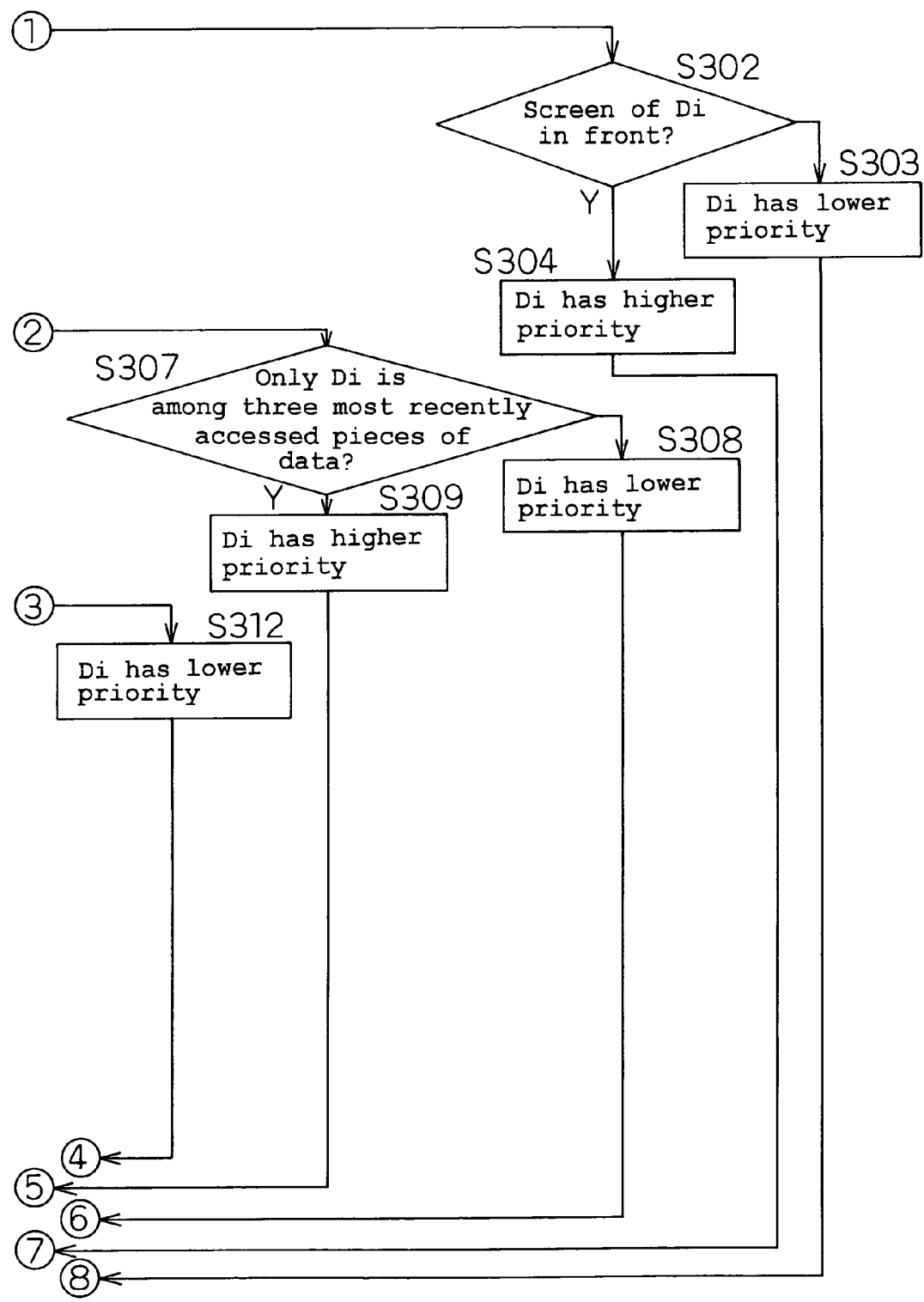
Figure 9:
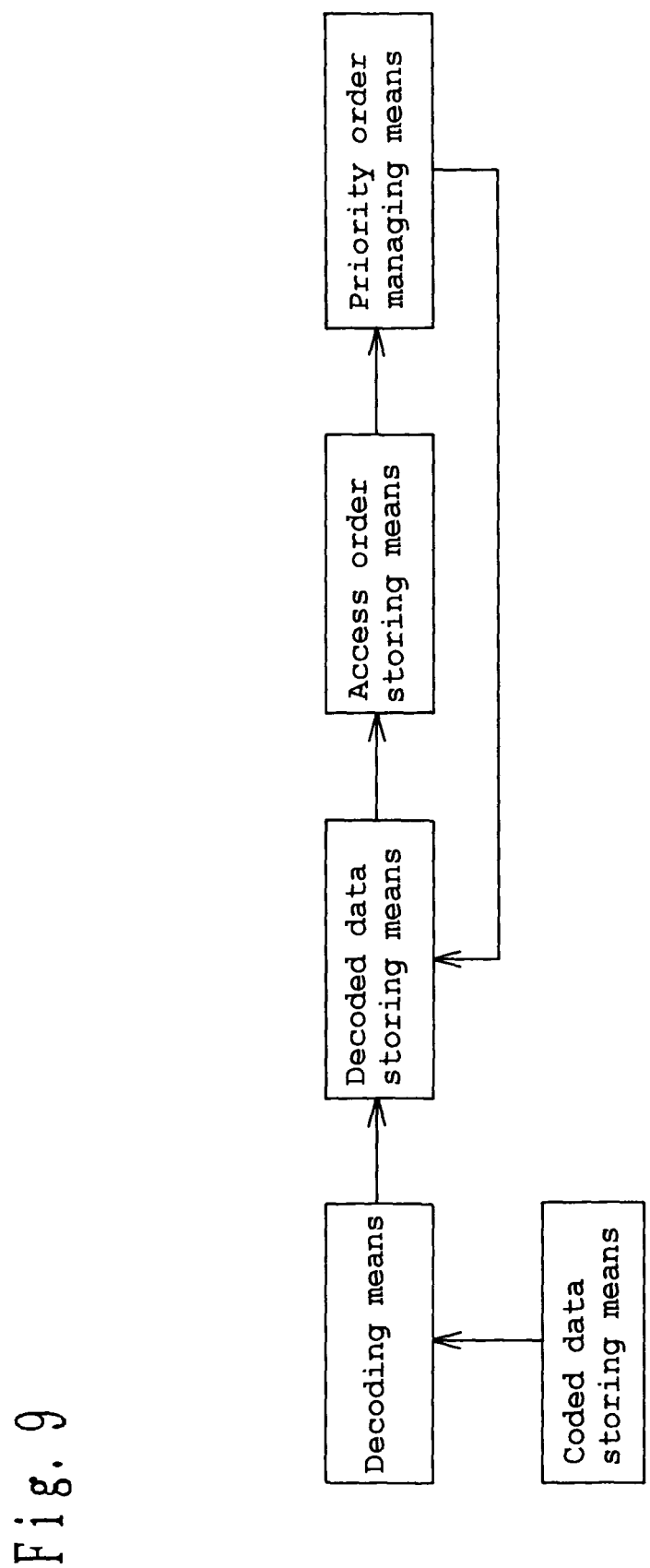
FIG. 9 is a block diagram of the conventional data managing device.
Figure 10:
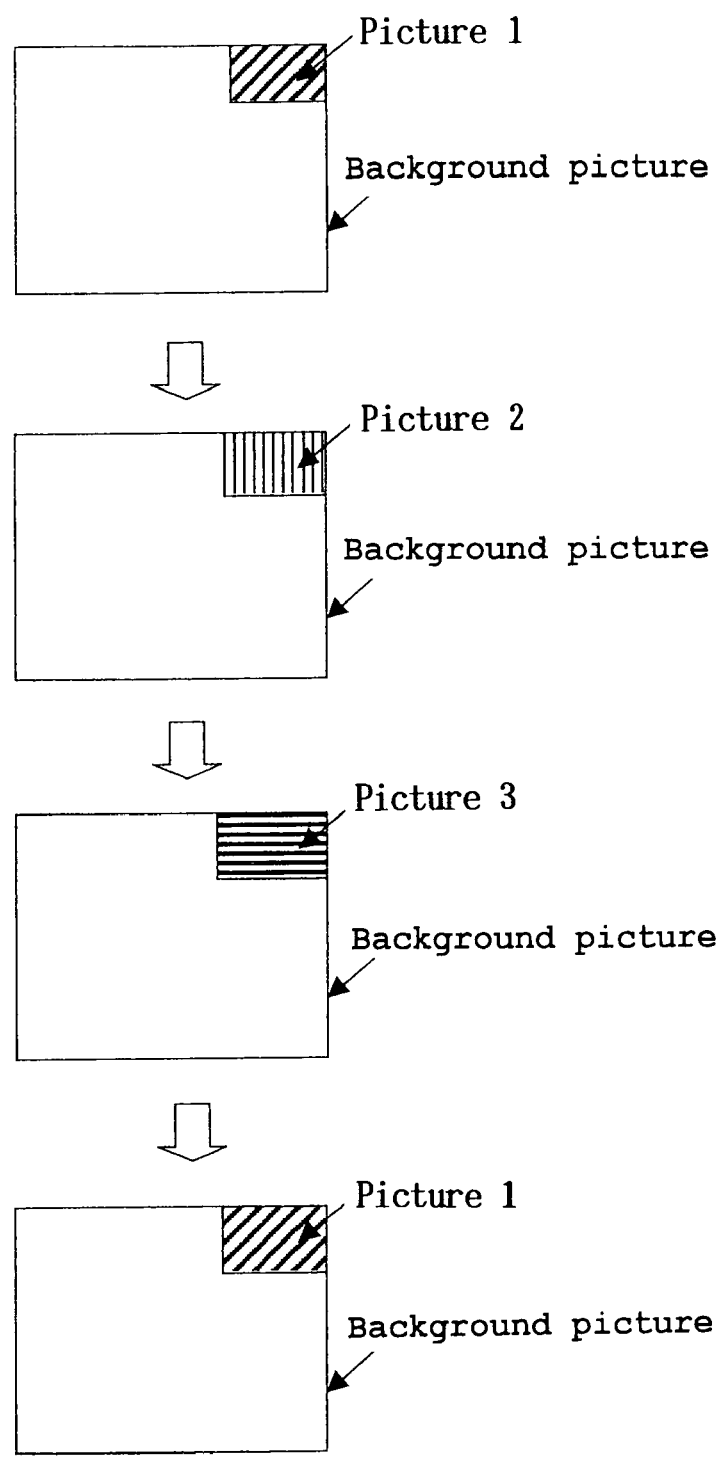
FIG. 10 is a view for explaining the problem of the conventional data managing device.

Specifically, the determination of the priority between two pieces of divisional decoded data Di and Dj by the priority order managing means 9 will be described with reference mainly to FIG. 8 that is a flowchart for explaining the priority determination processing by the data managing device of the present embodiment.

The priority in the present embodiment is not the priority of erasure but the priority for data with lower priority to be more readily erased (deallocated).

At step 301, the data type stored in the data type storing means 13 is checked. When the screen where Di is drawn and the screen where Dj is drawn are the same, the process shifts to step 305, and otherwise, the process shifts to step 302.

When the screen where Di is described is in front on the display at step 302, it is determined that Di has higher priority at step 304 and the process ends. Otherwise, it is determined that Di has lower priority at step 303 and the process ends (of the overlapping pieces of data, a piece of data situated forwarder is provided with lower priority of erasure).

The order of access stored in the access order storing means 11 is checked at step 305. When Di and Dj are both among the three most recently accessed pieces of data, the process shifts to step 310, and other wise, the process shifts to step 306.

When neither Di nor Dj is among the three most recently accessed pieces of data at step 306, the process shifts to step 310, and otherwise, the process shifts to step 307.

When only Di is among the three most recently accessed pieces of data at step 307, it is determined that Di has higher priority at step 309 and the process ends. Otherwise (that is, when only Dj is among the three most recently accessed pieces of data), it is determined that Di has lower priority at step 308 and the process ends.

The number of times of access in the access number storing means 10 is checked at step 310. When the number of times of access to Di and the number of times of access to Dj are the same, the process shifts to step 314, and otherwise, the process shifts to step 311.

When the number of times of access to Di is larger than the number of times of access to Dj at step 311, it is determined that Di has higher priority at step 313 and the process ends. Otherwise, it is determined that Di has lower priority at step 312 and the process ends.

At step 314, the coded data identifier of each piece of divisional decoded data stored in the divisional decoded data storing means 6 is checked. When Di and Dj have the same coded data identifier, the process shifts to step 315, and otherwise, it is determined that Di has higher priority at step 318 and the process ends.

At step 315, the decoding order in the decoding order storing means 15 is checked. When the decoding order of Di is later than the decoding order of Dj, it is determined that Di has higher priority at step 317 and the process ends. Otherwise, it is determined that Di has lower priority at step 316 and the process ends (a piece of divisional data requiring more procedures for decoding (here, data to be displayed in a lower part of a predetermined screen where the display is to be provided) is provided with lower priority of erasure).

By thus repeating the determination of the priority between two pieces of divisional decoded data, the order of priority among all the pieces of divisional decoded data can be determined.

At steps 305 to 307, a criterion of determination may be used such that the priority increases in order of access within a predetermined number of most recently accessed pieces of data.

In the above, the first embodiment is described in detail.

The access frequency detecting means of the present invention corresponds to the access number storing means 10 in the above-described present embodiment. However, the access frequency detecting means of the present invention is not limited thereto, but in sum, it may be any means of at least detecting the frequency of access to the stored divisional data (a piece of divisional data whose detected frequency of access is higher is provided with lower priority of erasure).

Moreover, the access time detecting means of the present invention corresponds to the access order storing means 11 in the above-described present embodiment. However, the access time detecting means of the present invention is not limited thereto, but in sum, it may be any means of at least detecting the time of access to the stored divisional data (a piece of divisional data whose detected time of access is later is provided with lower priority of erasure).

It is to be noted that, while the access frequency and the access time (and the decoding procedure) are all used in the above-described present embodiment, the present invention is not limited thereto, but may be structured so that only one or some of them is used.

To sum up, a data managing device having: data storing means of at least storing divisional data obtained by dividing data of a predetermined unit; and erasure priority order determining means of at least determining the priority as to erasure of the stored divisional data by use of a predetermined rule is included in the present invention (it is to be noted that a data display device having the following is also included in the present invention: the above-described data managing device; superposing means of superposing one on another the divided data of the predetermined unit, another divided data of the predetermined unit, or the undivided data of the predetermined unit, which data stored in the data storing means, and storing as composite data into a predetermined screen memory; and display means of displaying the composite data stored in the screen memory).

Moreover, a data display device having the following is also included in the present invention: data storing means of temporarily storing a plurality of pieces of data of a predetermined unit; a plurality of screen memories of extracting and storing the temporarily stored pieces of data of the predetermined unit; superposing means of superposing, for each pixel, any of the pieces of data of the predetermined unit from the screen memories based on overlap information for displaying the pieces of data of the predetermined unit so that they overlap each other; display means of displaying the superposed data for each pixel; and erasure priority order determining means of determining the priority as to erasure of the temporarily stored pieces of data of the predetermined unit by use of a predetermined rule.

It is to be noted that, while both the data division and the data superposition are performed in the above-described present embodiment, the present invention is not limited thereto, but may be structured so that only one of them is performed.

The present invention is a program for causing a computer to perform the functions of all or some of the means (or devices, elements, circuits, portions or the like) of the above-described data managing device and data display device of the present invention, which is a program that operates in cooperation with the computer. It is to be noted that the computer of the present invention is not limited to pure hardware such as a CPU but may include firmware, an OS and a peripheral.

Moreover, the present invention is a program for causing a computer to perform the operations of all or some of the steps (or processes, operations, workings or the like) of the above-described data managing method and data display method of the present invention, which is a program that operates in cooperation with the computer.

Some of the means (or devices, elements, circuits, portions or the like) of the present invention and some of the steps (or processes, operations, workings or the like) of the present invention mean the plurality of means, some means in the steps, or one step in the steps respectively, or mean one mean, some functions in one step, or some operations in one step respectively.

Moreover, some of the devices (or elements, circuits, portions or the like) of the present invention mean some of a plurality of devices, some means (or elements, circuits, portions or the like) of one device, or some functions of one means.

Moreover, a computer-readable recording medium on which the program of the present invention is recorded is also included in the present invention. Moreover, a usage of the program of the present invention may be such that the program is recorded on a computer-readable recording medium and operates in cooperation with a computer. Moreover, a usage of the program of the present invention may be such that the program is transmitted over a transmission medium, is read by a computer and operates in cooperation with the computer. Moreover, examples of the recording medium include ROMs, and examples of the transmission medium include transmission media such as the Internet, light, radio waves and sound waves.

The structure of the present invention may be implemented either via software or via hardware.

Moreover, the present invention is a medium carrying a program for causing a computer to perform all or some of the functions of all or some of the means of the above-described data managing device and data display device of the present invention, said medium being computer-readable and said program, being read, performing the functions in cooperation with the computer.

Moreover, the present invention is a medium carrying a program for causing a computer to perform all or some of the operations of all or some of the steps of the above-described data managing method and data display method of the present invention, said medium being computer-readable and said program, being read, performing the operations in cooperation with the computer.

As described above, the present invention is, for example, a data managing device having: divisional decoded data storing means of storing a plurality of pieces of divisional decoded data obtained by decoding and dividing coded data; and priority order managing means of determining so as to deallocate any of the pieces of divisional decoded data stored in the divisional decoded data storing means based on the priority of each piece of divisional decoded data when the memory area is insufficient.

Figure 11:
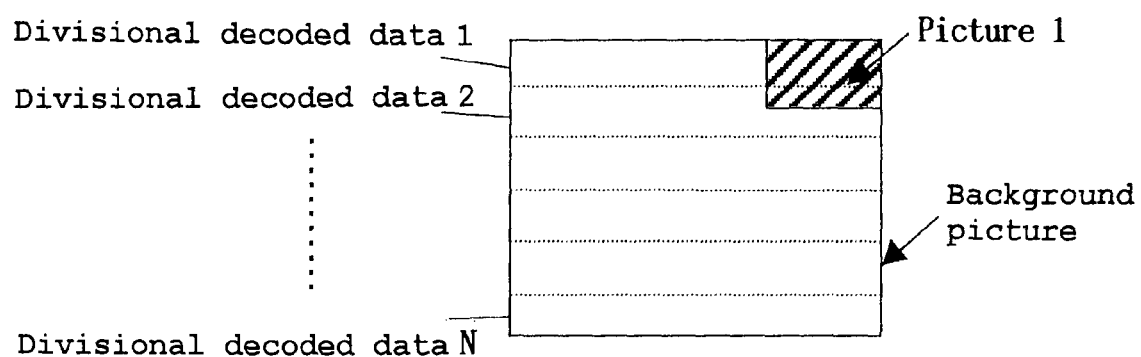
FIG. 11 is a view for explaining a solution to the problem provided by the data managing device of the present invention.

For example, as shown in FIG. 11 which is a view for explaining a solution to the problem provided by the data managing device of the present invention, by dividing and storing the decoded data of the background picture, when the picture 1, the picture 2 or the picture 3 is replaced, only the divisional decoded data 1 and the divisional decoded data 2 are accessed and their priority increases. The divisional decoded data 3 to the divisional decoded data N which are not accessed become lower in priority than the picture 1, the picture 2 and the picture 3, so that the divisional decoded data 1, the divisional decoded data 2 and the decoded data of the picture 1, the picture 2 and the picture 3 are left in the memory area. Consequently, it is unnecessary to perform decoding when a picture is replaced.

Describing more specifically, the present invention is, for example, a data managing device characterized by having: divisional decoded data storing means of storing a plurality of pieces of divisional decoded data obtained by decoding and dividing coded data; and priority order managing means of determining so as to deallocate any of the pieces of divisional decoded data stored in the divisional decoded data storing means based on the priority of each piece of divisional decoded data when the memory area is insufficient.

Moreover, the present invention is, for example, a data managing method characterized by being by: a divisional decoded data storing procedure of storing a plurality of pieces of divisional decoded data obtained by decoding and dividing coded data; and a priority order managing procedure of determining so as to deallocate any of the pieces of divisional decoded data stored by the divisional decoded data storing procedure based on the priority of each piece of divisional decoded data when the memory area is insufficient.

Moreover, the present invention is, for example, a storage medium storing a data managing program characterized by being by: a divisional decoded data storing procedure of storing a plurality of pieces of divisional decoded data obtained by decoding and dividing coded data; and a priority order managing procedure of determining so as to deallocate any of the pieces of divisional decoded data stored by the divisional decoded data storing procedure based on the priority of each piece of divisional decoded data when the memory area is insufficient.

Moreover, the present invention is, for example, a data managing device characterized by having: decoded data storing means of storing a plurality of pieces of decoded data; access number storing means of counting and storing the number of times of access to each piece of decoded data; access order storing means of storing the order of access among the pieces of decoded data; and priority order managing means of determining so as to deallocate any of the pieces of decoded data stored in the decoded data storing means in order of increasing number of times of access among a predetermined number of pieces of decoded data not accessed recently with reference to the access number storing means and the access order storing means when the memory area is insufficient.

Moreover, the present invention is, for example, a data managing method characterized by being by: a decoded data storing procedure of storing a plurality of pieces of decoded data; an access number storing procedure of counting and storing the number of times of access to each piece of decoded data; an access order storing procedure of storing the order of access among the pieces of decoded data; and a priority order managing procedure of determining so as to deallocate any of the pieces of decoded data stored by the decoded data storing means in order of increasing number of times of access among a predetermined number of pieces of decoded data not accessed recently by use of the access number storing procedure and the access order storing procedure when the memory area is insufficient.

Moreover, the present invention is, for example, a storage medium storing a data managing program characterized by being by: a decoded data storing procedure of storing a plurality of pieces of decoded data; an access number storing procedure of counting and storing the number of times of access to each piece of decoded data; an access order storing procedure of storing the order of access among the pieces of decoded data; and a priority order managing procedure of determining so as to deallocate any of the pieces of decoded data stored by the decoded data storing means in order of increasing number of times of access among a predetermined number of pieces of decoded data not accessed recently by use of the access number storing procedure and the access order storing procedure when the memory area is insufficient.

Moreover, the present invention is, for example, a data managing device managing drawing data for displaying picture objects on a plurality of screens, said data managing device being characterized by having: decoded data storing means of storing decoded data of a plurality of pieces of coded drawing data; data type storing means of storing decoded data and a screen where the decoded data is to be displayed, so as to be associated with each other; and priority order managing means of managing the priority of each piece of decoded data by use of information stored in the data type storing means, and determining so as to deallocate any of the pieces of decoded data stored in the decoded data storing means based on the priority when the memory area is insufficient.

Moreover, the present invention is, for example, a data managing method of managing drawing data for displaying picture objects on a plurality of screens, said data managing procedure being characterized by being by: a decoded data storing procedure of storing decoded data of a plurality of pieces of coded drawing data; a data type storing procedure of storing decoded data and a screen where the decoded data is to be displayed, so as to be associated with each other; and a priority order managing procedure of managing the priority of each piece of decoded data by use of information stored by the data type storing procedure, and determining so as to deallocate any of the pieces of decoded data stored by the decoded data storing procedure based on the priority when the memory area is insufficient.

Moreover, the present invention is, for example, a storage medium storing a data managing program characterized by being by: a decoded data storing procedure of storing decoded data of a plurality of pieces of coded drawing data; a data type storing procedure of storing decoded data and a screen where the decoded data is to be displayed, so as to be associated with each other; and a priority order managing procedure of managing the priority of each piece of decoded data by use of information stored by the data type storing procedure, and determining so as to deallocate any of the pieces of decoded data stored by the decoded data storing procedure based on the priority when the memory area is insufficient in a data managing procedure of managing drawing data for displaying picture objects on a plurality of screens.

Moreover, the present invention is, for example, the above-described data managing device characterized in that the priority order managing means determines the priority according to the order of decoding among the pieces of divisional decoded data obtained by decoding the same coded data.

Moreover, the present invention is, for example, the above-described data managing method characterized in that the priority order managing procedure determines the priority according to the order of decoding among the pieces of divisional decoded data obtained by decoding the same coded data.

Moreover, the present invention is, for example, the above-described storage medium storing the data managing program characterized in that the priority order managing means determines the priority according to the order of decoding among the pieces of divisional decoded data obtained by decoding the same coded data.

Consequently, according to the present invention, for example, by managing decoded data for each of the pieces of divisional decoded data obtained by dividing the decoded data, it is unnecessary to store or deallocate the entire decoded data when a processing requiring only part of the decoded data such as redrawing is performed, so that the memory area can be used effectively.

Moreover, according to the present invention, for example, when a drawing processing such that transition is made among a plurality of scenes is performed, by the LRU, since the priority of the decoded data used for the previous scene decreases when drawing is repeated in a new scene, there is a possibility that many pieces of decoded data have been deallocated when the scene is returned to the previous one. However, in the present invention, by deallocating any of the pieces of decoded data stored in the decoded data storing means in order of increasing number of times of access among a predetermined number of pieces of decoded data not recently accessed, the pieces of decoded data with a large number of times of access are not readily deallocated even if they have not been accessed recently. Consequently, the frequency is low with which re-decoding is performed when the scenes is returned to the previous one, so that processing can be performed at high speed.

Moreover, according to the present invention, for example, in a case where picture objects are displayed on a plurality of screens, by determining the priority of the decoded data according to the screen where the data is to be displayed, for example, when a drawing processing is performed in such a way that a background picture is drawn on the screen at the back and a picture is moved on a screen in front, the priority of the decoded data can be decreased, where in the decoded data is necessary for drawing the picture at the back of the screen unnecessary for redrawing with a large memory capacity, so that the memory area can be used effectively.

Moreover, according to the present invention, for example, in a coding method such as JPEG, decoding cannot be performed unless coded data is decoded from the first piece in order. Therefore, even if a prior divisional decoded data in the order of decoding process has already been stored, the part is also re-decoded when a later divisional decoded data in the decoding order is requested. In the present invention, by providing the later divisional decoded data in the order of decoding process with higher priority among the pieces of divisional decoded data obtained by decoding the same coded data, the possibility of occurrence of the above-described case can be reduced.

The entire disclosure of the above is incorporated herein by citation (by reference) in its entirety.

INDUSTRIAL APPLICABILITY

As is apparent from the description given above, the present invention has an advantage that the use efficiency of the memory area can be improved.

The invention claimed is:

1. A data managing device comprising:
   data storing means of at least storing divisional data obtained by dividing data of a predetermined unit,
   erasure priority order determining means of at least determining priority as to erasure of the stored divisional data by use of a predetermined rule, and
   access frequency detecting means of at least detecting a frequency of access to the stored divisional data; and
   wherein said predetermined rule is a rule, (1) for providing divisional data whose detected frequency of access is higher with lower priority of erasure, and (2) for providing divisional data requiring more procedures for the decoding with lower priority of erasure, and
   said data of the predetermined unit is data obtained by decoding coded data.

2. A data managing device comprising:
   data storing means of at least storing divisional data obtained by dividing data of a predetermined unit,
   erasure priority order determining means of at least determining priority as to erasure of the stored divisional data by use of a predetermined rule, and
   access time detecting means of at least detecting a time of access to the stored divisional data; and
   wherein said predetermined rule is a rule, (1) for providing divisional data whose detected time of access is later with lower priority of erasure, and (2) for providing divisional data requiring more procedures for the decoding with lower priority of erasure, and said data of the predetermined unit is data obtained by decoding coded data.

3. A data managing device according to claim 1 or 2, wherein said divisional data requiring more procedures for the decoding is data to be displayed in a lower part of a predetermined screen where the display is to be provided.

4. A data display device comprising:

the data managing device according to any of claims 1 or 2;

superposing means of superposing one on another the divided data of the predetermined unit and another divided data of the predetermined unit or data of the predetermined unit not divided which data are stored in the data storing means, and storing the data into a predetermined screen memory as composite data; and display means of displaying the composite data stored in the screen memory.

5. A data managing method comprising:

a step of at least storing divisional data obtained by dividing data of a predetermined unit, a step of at least determining priority as to erasure of the stored divisional data by use of a predetermined rule, and a step of at least detecting a frequency of access to the stored divisional data; and wherein said predetermined rule is a rule, (1) for providing divisional data whose detected frequency of access is higher with lower priority of erasure, and (2) for providing divisional data requiring more procedures for the decoding with lower priority of erasure, and said data of the predetermined unit is data obtained by decoding coded data.

6. A program embodied in a computer-readable storage medium for causing a computer to execute all or some of the following steps of the data managing method according to claim 5: a step of at least storing divisional data obtained by dividing data of a predetermined unit; a step of at least determining priority as to erasure of the stored divisional data by use of a predetermined rule; and a step of at least detecting a frequency of access to the stored divisional data.

7. A computer-readable storage medium carrying a program embodied therein for causing a computer to execute all or some of the following steps of the data managing method according to claim 5: a step of at least storing divisional data obtained by dividing data of a predetermined unit; a step of at least determining priority as to erasure of the stored divisional data by use of a predetermined rule; and a step of at least detecting a frequency of access to the stored divisional data.

8. A data managing method comprising:

a step of at least storing divisional data obtained by dividing data of a predetermined unit, a step of at least determining priority as to erasure of the stored divisional data by use of a predetermined rule, and a step of at least detecting a time of access to the stored divisional data; and wherein said predetermined rule is a rule, (1) for providing divisional data whose detected time of access is later with lower priority of erasure, and (2) for providing divisional data requiring more procedures for the decoding with lower priority of erasure, and said data of the predetermined unit is data obtained by decoding coded data.

9. A program embodied in a computer-readable storage medium for causing a computer to execute all or some of the following steps of the data managing method according to claim 8: a step of at least storing divisional data obtained by dividing data of a predetermined unit; a step of at least determining priority as to erasure of the stored divisional data by use of a predetermined rule; and a step of at least detecting a time of access to the stored divisional data.

10. A computer-readable storage medium carrying a program embodied therein for causing a computer to execute all or some of the following steps of the data managing method according to claim 8: a step of at least storing divisional data obtained by dividing data of a predetermined unit; a step of at least determining priority as to erasure of the stored divisional data by use of a predetermined rule; and a step of at least detecting a time of access to the stored divisional data.

* * * * *